United States Patent
Cheng et al.

(10) Patent No.: US 7,970,993 B2
(45) Date of Patent: Jun. 28, 2011

(54) ROTATING PARITY REDUNDANT ARRAY OF INDEPENDENT DISK AND METHOD FOR STORING PARITY THE SAME

(75) Inventors: Hsiang-Ting Cheng, Tao Yuan Shien (TW); Ching-Hsiang Chan, Tao Yuan Shien (TW); Chung-Hsi Hung, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 817 days.

(21) Appl. No.: 11/987,320

(22) Filed: Nov. 29, 2007

(65) Prior Publication Data

US 2009/0089502 A1 Apr. 2, 2009

(30) Foreign Application Priority Data

Sep. 27, 2007 (TW) .............................. 96136053 A (51) Int. Cl.
- G06F 12/00 (2006.01)
- G06F 3/06 (2006.01)
- G06F 13/00 (2006.01)
- G06F 13/28 (2006.01)
- G06F 11/00 (2006.01)
- G11C 29/00 (2006.01)
- H03M 13/00 (2006.01)

(52) U.S. Cl. ................... 711/114; 711/4; 711/E12.001; 714/6; 714/770; 714/800

(58) Field of Classification Search .............. 711/4, 114, 711/E12.001; 714/6, 770, 800
See application file for complete search history.

(56) References Cited

U.S. PATENT DOCUMENTS

| | | | | |
|---|---|---|---|---|
| 5,537,567 | A | * | 7/1996 | Galbraith et al. ............ 711/114 |
| 6,993,701 | B2 | * | 1/2006 | Corbett et al. ................ 714/770 |
| 7,398,460 | B1 | * | 7/2008 | Corbett ........................ 714/800 |
| 2005/0097270 | A1 | * | 5/2005 | Kleiman et al. .............. 711/114 |
| 2005/0182992 | A1 | * | 8/2005 | Land et al. ................... 714/701 |
| 2006/0074995 | A1 | * | 4/2006 | Hafner et al. ................. 707/201 |
| 2007/0180300 | A1 | * | 8/2007 | Qin et al. .......................... 714/6 |

FOREIGN PATENT DOCUMENTS
- EP 1674997 A2 * 6/2006
- TW 200721125 6/2007

* cited by examiner

*Primary Examiner* — Shane M Thomas
*Assistant Examiner* — Michael Alsip
(74) *Attorney, Agent, or Firm* — Rabin and Berdo, P.C.

(57) ABSTRACT

A rotating parity redundant array of independent disk (RAID) and a method for storing parity of the same are provided. The rotating parity RAID comprises a first~a third disk. The first disk has $A_1$~$A_m$ blocks for storing $A_1$~$A_m$ data respectively. The second disk has $B_1$~$B_m$ blocks for storing $B_1$~$B_m$ data respectively. The third disk has $C_1$~$C_m$ blocks for storing $C_1$~$C_m$ data respectively. The $C_{n+k}$ data is an $n^{th}$ parity data obtained from the $A_n$ data and the $B_n$ data. The $B_{n+k+1}$ data is an $(n+1)^{th}$ parity data obtained from the $C_{n+1}$ data and the $A_{n+1}$ data. The $A_{n+k+2}$ data is an $(n+2)^{th}$ parity data obtained from the $B_{n+2}$ data and the $C_{n+2}$ data.

16 Claims, 5 Drawing Sheets

ROTATING PARITY REDUNDANT ARRAY OF INDEPENDENT DISK AND METHOD FOR STORING PARITY THE SAME

This application claims the benefit of Taiwan application Ser. No. 96136053, filed Sep. 27, 2007, the subject matter of which is incorporated herein by reference.

BACKGROUND OF THE INVENTION

1. Field of the Invention

The invention relates in general to a rotating parity redundant array of independent disk and a method for storing parity of the same, and more particularly to a rotating parity redundant array of independent disk where the address for storing parity data is changed and a method for storing parity of the same.

2. Description of the Related Art

A redundant array of independent disk (RAID) is a large capacity array constituted by many small capacity and low price disks. As many small capacity disks cost less than a large capacity disk, the redundant array of independent disk is cost saving. Then, the redundant array of independent disk divides data into several chunks and stores the chunks into respective disks of the redundant array of independent disk. Thus, data can be assessed simultaneously from respective disks, hence the accessing speed is increased. Besides, a rotating parity redundant array of independent disk contains parity data alternately stored in disks. When one of the disks is inaccessible or damaged, it is feasible to exclude the inaccessible or damaged disk and restore data according to the parity data of the remaining disks. Thus, security and reliability of data storage is enhanced.

A rotating parity redundant array of independent disk can be several levels such as a RAID 5, a RAID 6, a RAID 50, or a RAID 60.

Figure 1:
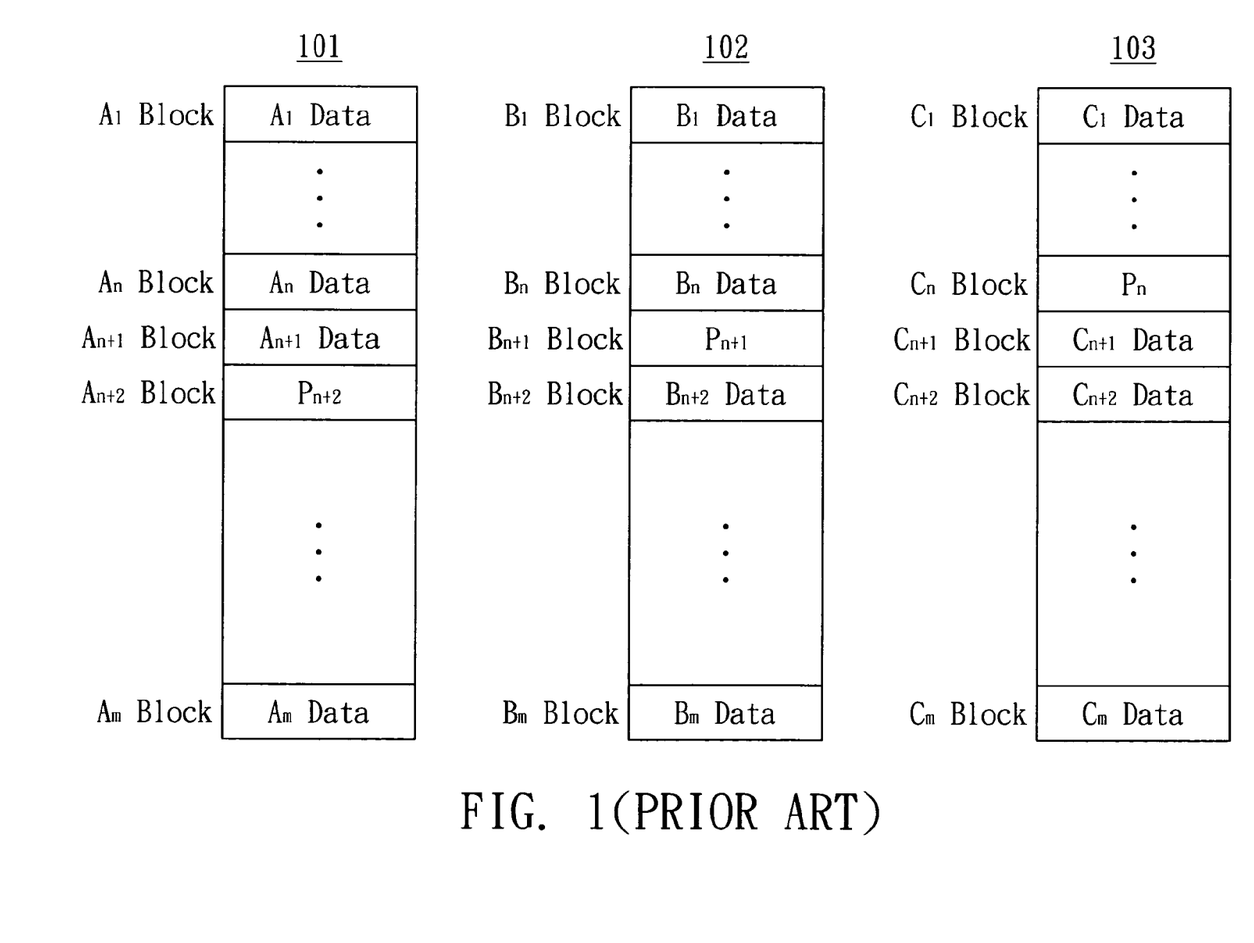
FIG. 1 is a perspective of a conventional RAID 5.

Let a conventional rotating parity redundant array of independent disk be exemplified by a RAID 5 with accompanied drawings. FIG. 1 is a perspective of a conventional RAID 5. The conventional RAID 5 at least comprises a first disk 101, a second disk 102 and a third disk 103. The first disk 101 has an $A_1$ block, an $A_2$ block, ..., and an $A_m$ block used for storing an $A_1$ data, an $A_2$ data, ..., and an $A_m$ data respectively. The second disk 102 has a $B_1$ block, a $B_2$ block, ..., and a $B_m$ block used for storing a $B_1$ data, a $B_2$ data, ..., and a $B_m$ data respectively. The third disk 103 has a $C_1$ block, a $C_2$ block, ..., and a $C_m$ block used for storing a $C_1$ data, a $C_2$ data, ..., and a $C_m$ data respectively. In the RAID 5, the $A_1$ block, the $B_1$ block, and the $C_1$ block correspond to each other are referred to as a first stripe (not illustrated in the diagram). Likewise, the $A_2$ block ~the $A_m$ block, the $B_2$ block ~the $B_m$ block, and the $C_2$ block ~the $C_m$ block are referred to as a second stripe ~an $m^{th}$ stripe respectively.

In the conventional RAID 5, the $n^{th}$ parity data $P_n$ of the $n^{th}$ stripe obtained from the $A_n$ data and the $B_n$ data is stored in the $C_n$ block. The $(n+1)^{th}$ parity data $P_{n+1}$ of the $(n+1)^{th}$ stripe obtained from the $A_{n+1}$ data and the $C_{n+1}$ data is stored in the $B_{n+1}$ block. The $(n+2)^{th}$ parity data $P_{n+2}$ of the $(n+2)^{th}$ stripe obtained from the $B_{n+2}$ data and the $C_{n+2}$ data is stored in the $A_{n+2}$ block, wherein $1 \leq (n+2) \leq m$, m and n are positive integers.

Each parity data is written into the disk by generation on-the-fly. Meanwhile, parity data is calculated and written into the RAID. That is, after the $A_n$ data is written into the $A_n$ block and the $B_n$ data is written into the $B_n$ block, the RAID computes the $n^{th}$ parity data $P_n$ and writes the $n^{th}$ parity data $P_n$ into the $C_n$ block at the same time. Similarly, after the $C_{n+1}$ data is written into the $C_{n+1}$ block and the $A_{n+1}$ data is written into the $A_{n+1}$ block, the RAID computes the $(n+1)^{th}$ parity data $P_{n+1}$ and writes it into the $B_{n+1}$ block at the same time. The $n^{th}$ parity data $P_n$ can not be computed until the $A_n$ data and the $B_n$ data are written into the $A_n$ block and the $B_n$ block. Therefore, it may happen that the $n^{th}$ parity data $P_n$ is obtained when the $A_n$ data, the $B_n$ data, the $A_{n+1}$ data and the $C_{n+1}$ data are sequentially written into the RAID. Consequently, in terms of the third disk 103, the head (not illustrated in the diagram) has to position from the $C_{n+1}$ block to the $C_n$ block for storing the $n^{th}$ parity data $P_n$, and position to the $C_{n+2}$ block for storing the $C_{n+2}$ data after the $n^{th}$ parity data $P_n$ is stored. Thus, it is necessary for the head of the third disk 103 to shift between different blocks, so the storage efficiency of the RAID is reduced. The head is a mechanical element which is subject to wear and tear if it shifts too frequently. If the head shifts too frequency, the lifespan of the disk is shortened, and the stability and efficiency of the RAID are affected.

Although it is exemplified by a RAID 5, the same problem exists in other level of rotating parity RAID. The efficiency of the RAID is decreased if the head shifts back and forth too frequently. Therefore, how to deduce the shifting time of the head of a rotating parity RAID is an essential issue to be resolved.

SUMMARY OF THE INVENTION

The invention is directed to a rotating parity redundant array of independent disk and a method for storing parity of the same. The $n^{th}$ parity data of the $n^{th}$ stripe is stored in the $(n+k)^{th}$ stripe, so that the time and distance of shifting the head between different blocks are reduced. As a result, disk-assessing efficiency is increased, lifespan is extended and stability is enhanced.

According to a first aspect of the present invention, a rotating parity redundant array of independent disk (RAID) comprising a first disk, a second disk and a third disk is provided. The first disk has an $A_1$ block, an $A_2$ block, ..., and an $A_m$ block for storing an $A_1$ data, an $A_2$ data, ..., and an $A_m$ data respectively. The second disk has a $B_1$ block, a $B_2$ block, ..., and a $B_m$ block for storing a $B_1$ data, a $B_2$ data, ..., and a $B_m$ data respectively. The third disk has a $C_1$ block, a $C_2$ block, ..., and a $C_m$ block for storing a $C_1$ data, a $C_2$ data, ..., and a $C_m$ data respectively. The $C_{n+k}$ data is an $n^{th}$ parity data obtained from the $A_n$ data and the $B_n$ data. The $B_{n+k+1}$ data is an $(n+1)^{th}$ parity data obtained from the $C_{n+1}$ data and the $A_{n+1}$ data. The $A_{n+k+2}$ data is an $(n+2)^{th}$ parity data obtained from the $B_{n+2}$ data and the $C_{n+2}$ data, wherein $1 \leq (n+k+2) \leq m$; besides, m, n and k are positive integers.

According to a second aspect of the present invention, a rotating parity redundant array of independent disk is provided. The rotating parity redundant array of independent disk comprises a first disk, a second disk, a third disk and a fourth disk. The first disk has an $A_1$ block, an $A_2$ block, ..., and an $A_m$ block for storing an $A_1$ data, an $A_2$ data, ..., and an $A_m$ data respectively. The second disk has a $B_1$ block, a $B_2$ block, ..., and a $B_m$ block for storing a $B_1$ data, a $B_2$ data, ..., and a $B_m$ data respectively. The third disk has a $C_1$ block, a $C_2$ block, ..., and a $C_m$ block for storing a $C_1$ data, a $C_2$ data, ..., and a $C_m$ data respectively. The fourth disk has a $D_1$ block, a $D_2$ block, ..., and a $D_m$ block for storing a $D_1$ data, a $D_2$ data, ..., and a $D_m$ data respectively. The $C_{n+k}$ data is an $n^{th}$ parity data obtained from the $A_n$ data and the $B_n$ data. The $D_{n+k}$ data is another $n^{th}$ parity data obtained from the $A_n$ data and the $B_n$ data. The $B_{n+k+1}$ data is an $(n+1)^{th}$ parity data obtained from the $A_{n+1}$ data and the $D_{n+1}$ data. The $C_{n+k+1}$ is another $(n+1)^{th}$ parity data obtained from the $A_{n+1}$ data and the $D_{n+1}$ data. The $A_{n+k+2}$ data is an $(n+2)^{th}$ parity data obtained from the $C_{n+2}$ data and the $D_{n+2}$ data. The $B_{n+k+2}$ data is another $(n+2)^{th}$ parity data obtained from the $C_{n+2}$ data and the $D_{n+2}$ data. The $D_{n+k+3}$ data is an $(n+3)^{th}$ parity data obtained from the $B_{n+3}$ data and the $C_{n+3}$ data. The $A_{n+k+3}$ data is another $(n+3)^{th}$ parity data obtained from the $B_{n+3}$ data and the $C_{n+3}$ data, wherein $1 \leq (n+k+3) \leq m$; besides, m, n and k are positive integers.

According to a third aspect of the present invention, a method for storing parity of a rotating parity redundant array of independent disk (RAID) is provided. The method performs parity storage on a rotating parity RAID. The rotating parity RAID comprises a first disk, a second disk and a third disk. The first disk has an $A_1$ block, an $A_2$ block, ..., and an $A_m$ block for storing an $A_1$ data, an $A_2$ data, ..., and an $A_m$ data respectively. The second disk has a $B_1$ block, a $B_2$ block, ..., and a $B_m$ block for storing a $B_1$ data, a $B_2$ data, ..., and a $B_m$ data respectively. The third disk has a $C_1$ block, a $C_2$ block, ..., and a $C_m$ block for storing a $C_1$ data, a $C_2$ data, ..., and a $C_m$ data respectively. The method for storing parity comprises the following steps. Firstly, an $n^{th}$ parity data obtained from the $A_n$ data and the $B_n$ data is stored into the $C_{n+k}$ block. Next, an $(n+1)^{th}$ parity data obtained from the $C_{n+1}$ data and the $A_{n+1}$ data is stored into the $B_{n+k+1}$ block. Afterwards, an $(n+2)^{th}$ parity data obtained from the $B_{n+2}$ data and the $C_{n+2}$ data is stored into the $A_{n+k+2}$ block, wherein $1 \leq (n+k+2) \leq m$; besides, m, n and k are positive integers.

According to a fourth aspect of the present invention, a method for storing parity of a rotating parity redundant array of independent disk (RAID) is provided. The method performs parity storage on a rotating parity RAID. The rotating parity RAID comprises a first disk, a second disk, a third disk and a fourth disk. The first disk has an $A_1$ block, an $A_2$ block, ..., and an $A_m$ block for storing an $A_1$ data, an $A_2$ data, ..., and an $A_m$ data respectively. The second disk has a $B_1$ block, a $B_2$ block, ..., and a $B_m$ block for storing a $B_1$ data, a $B_2$ data, ..., and a $B_m$ data respectively. The third disk has a $C_1$ block, a $C_2$ block, ..., and a $C_m$ block for storing a $C_1$ data, a $C_2$ data, ..., and a $C_m$ data respectively. The fourth disk has a $D_1$ block, a $D_2$ block, ..., and a $D_m$ block for storing a $D_1$ data, a $D_2$ data, ..., and a $D_m$ data respectively. The method for storing parity comprises the following steps. Firstly, an $n^{th}$ parity data obtained from the $A_n$ data and the $B_n$ data is stored into the $C_{n+k}$ block. Next, another $n^{th}$ parity data obtained from the $A_n$ data and the $B_n$ data is stored into the $D_{n+k}$ block. Then, an $(n+1)^{th}$ parity data obtained from the $A_{n+1}$ data and the $D_{n+1}$ data is stored into the $B_{n+k+1}$ block. Afterwards, another $(n+1)^{th}$ parity data obtained from the $A_{n+1}$ data and the $D_{n+1}$ data is stored into the $C_{n+k+1}$ block. Then, an $(n+2)^{th}$ parity data obtained from the $C_{n+2}$ data and the $D_{n+2}$ data is stored into the $A_{n+k+2}$ block. Next, another $(n+2)^{th}$ parity data obtained from the $C_{n+2}$ data and the $D_{n+2}$ data is stored into the $B_{n+k+2}$ block. Afterwards, an $(n+3)^{th}$ parity data obtained from the $B_{n+3}$ data and the $C_{n+3}$ data is stored into the $D_{n+k+3}$ block. Lastly, another $(n+3)^{th}$ parity data obtained from the $B_{n+3}$ data and the $C_{n+3}$ data is stored into the $A_{n+k+3}$ block, wherein $1 \leq (n+k+3) \leq m$; besides, m, n and k are positive integers.

The invention will become apparent from the following detailed description of the preferred but non-limiting embodiments. The following description is made with reference to the accompanying drawings.

DETAILED DESCRIPTION OF THE INVENTION

First Embodiment

Figure 2:
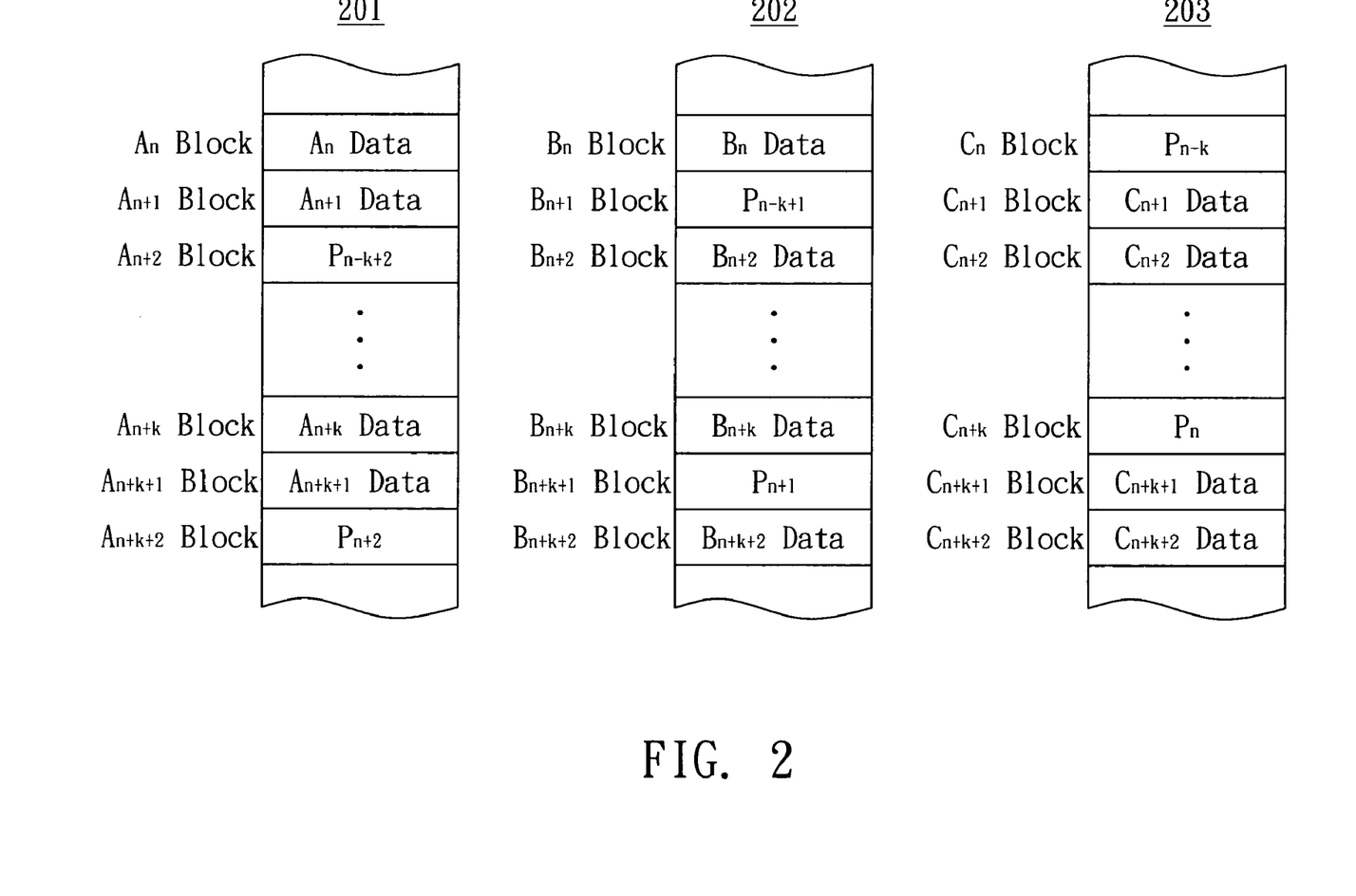
FIG. 2 is a perspective of a RAID 5 according to a first embodiment of the invention.

Referring to FIG. 2, a perspective of a RAID 5 according to a first embodiment of the invention is shown. As indicated in FIG. 2, the RAID 5 comprises at least a first disk 201, a second disk 202 and a third disk 203. The first disk 201 has an $A_1$ block, an $A_2$ block, ..., and $A_m$ block used for storing an $A_1$ data, an $A_2$ data, ..., and an $A_m$ data respectively. The second disk 202 has a $B_1$ block, a $B_2$ block, ..., and a $B_m$ block used for storing a $B_1$ data, a $B_2$ data, ..., and a $B_m$ data respectively. The third disk 203 has a $C_1$ block, a $C_2$ block, ..., and a $C_m$ block used for storing a $C_1$ data, a $C_2$ data, ..., and a $C_m$ data respectively. The $A_1$ block, the $B_1$ block and the $C_1$ block are referred to as a first stripe. Similarly, the $A_2$ block the $A_m$ block, the $B_2$ block ~the $B_m$ block, and the $C_2$ block ~the $C_m$ block are referred to as a second stripe ~an $m^{th}$ stripe respectively. Despite the RAID 5 in the present embodiment of the invention has three disks, the invention is not limited thereto. That is, a person with ordinary skill in the art will understand that this invention is applicable to a RAID 5 which has four or more than four disks.

According to the RAID 5 of the invention, the $n^{th}$ parity data $P_n$ of the $n^{th}$ stripe obtained from the $A_n$ data and the $B_n$ data is stored in the $C_{n+k}$ block. The $(n+1)^{th}$ parity data $P_{n+1}$ of the $(n+1)^{th}$ stripe obtained from the $A_{n+1}$ data and the $C_{n+1}$ data is stored in the $B_{n+k+1}$ block. The $(n+2)^{th}$ parity data $P_{n+2}$ of the $(n+2)^{th}$ stripe obtained from the $B_{n+2}$ data and the $C_{n+2}$ data is stored in the $A_{n+k+2}$ block, wherein $1 \leq (n+k+2) \leq m$; besides, m, n and k are positive integers. Compared with the conventional RAID which stores the $n^{th}$ parity data $P_n$ into the $C_n$ block, the RAID of the invention stores the $n^{th}$ parity data $P_n$ into the $C_{n+k}$ block. In terms of the third disk 203, with a pre-determined k value, the position of the head is substantially close to the $C_{n+k}$ block when it happens that the $n^{th}$ parity data $P_n$ is obtained. Therefore, with the $n^{th}$ parity data $P_n$ being stored into the $C_{n+k}$ block, the time and distance of shifting the head are reduced, hence the accessing efficiency of the RAID is improved.

According to the RAID 5 of the first embodiment of the invention, n is an increasing sequence whose difference is 3, that is, n=1, 4, 7, ..., for obtaining the first parity data $P_1$~the $m^{th}$ parity data $P_m$. Accordingly, the $C_n$ data stored in the $C_n$ block is the $(n-k)^{th}$ parity data $P_{n-k}$; the $B_{n+1}$ data stored in the $B_{n+1}$ block is the $(n-k+1)^{th}$ parity data $P_{n-k+1}$; the $A_{n+2}$ data stored in the $A_{n+2}$ block is the $(n-k+2)^{th}$ parity data $P_{n-k+2}$.

Furthermore, k is preferably equal to x*y, wherein x is the number of the disks. In the present embodiment of the invention, the RAID has three disks, so x=3. The value of y is a positive integer pre-determined according to the writing speed of the disks. As the faster the writing speed is, the smaller the value of y will be.

Besides, each parity data is obtained from its corresponding data by operating a polynomial, such as an XOR operation. Let the $A_n$ data, the $B_n$ data and the $n^{th}$ parity data $P_n$ be taken for example: ($A_n$ data) XOR ($B_n$ data)=(the $n^{th}$ parity data $P_n$). However, the $n^{th}$ parity data $P_n$ can also be obtained from the $A_n$ data and the $B_n$ data by operating other polynomials.

Figure 3:
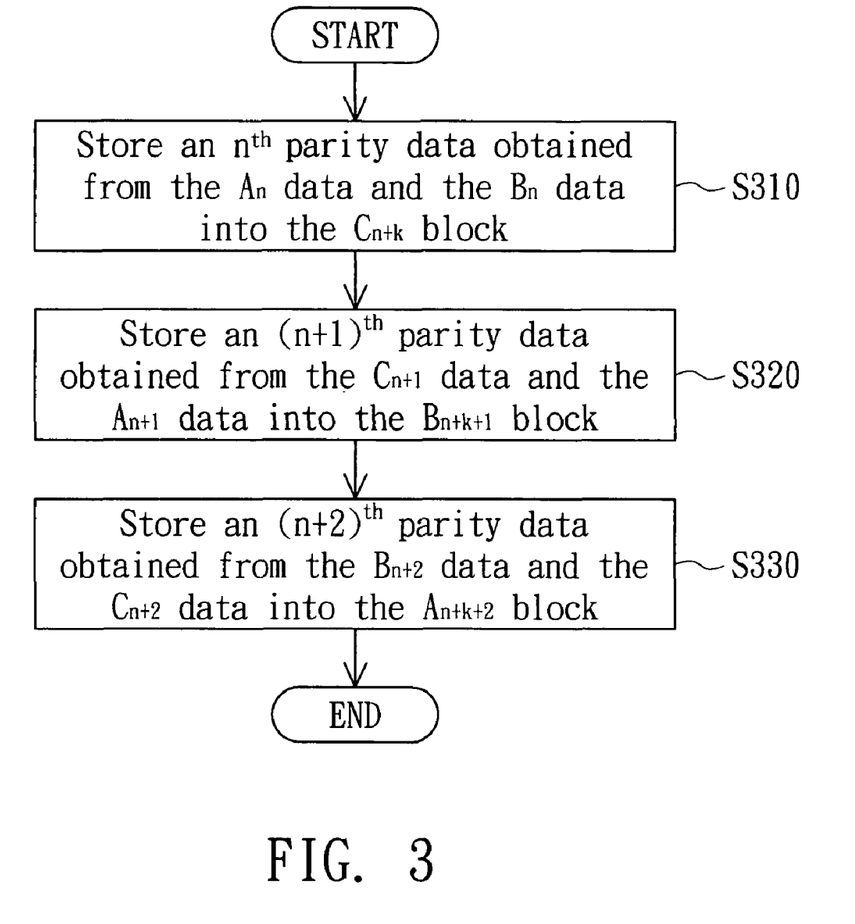
FIG. 3 is a flowchart of a method for storing parity of the RAID 5 according to a first embodiment of the invention.

The method for storing parity of the RAID 5 of the present embodiment of the invention is elaborated below with an accompanied flowchart. Referring to both FIG. 2 and FIG. 3, FIG. 3 is a flowchart of a method for storing parity of the RAID 5 according to a first embodiment of the invention. Firstly, the method begins at step S310, an $n^{th}$ parity data $P_n$ obtained from the $A_n$ data and the $B_n$ data is stored in the $C_{n+k}$ block, wherein the $n^{th}$ parity data $P_n$ could be obtained by an XOR operation. When obtaining the $n^{th}$ parity data $P_n$, it happens that the head of the third disk 203 substantially positions at the $C_{n+k}$ block. Thus, the time and distance of shifting the head of the third disk 203 is decreased.

Next, the method proceeds to step S320, the $(n+1)^{th}$ parity data $P_{n+1}$ obtained from the $C_{n+1}$ data and the $A_{n+1}$ data is stored into the $B_{n+k+1}$ block. When obtaining the $(n+1)^{th}$ parity data $P_{n+1}$, it happens that the head of the second disk 202 substantially positions at the $B_{n+k+1}$ block. Thus, storing the $(n+1)^{th}$ parity data $P_{n+1}$ into the $B_{n+k+1}$ block can reduce the time and distance of shifting the head of the second disk 202.

Then, the method proceeds to step S330, the $(n+2)^{th}$ parity data $P_{n+2}$ obtained from the $B_{n+2}$ data and the $C_{n+2}$ data is stored into the $A_{n+k+2}$ block. When obtaining the $(n+2)^{th}$ parity data $P_{n+2}$, it happens that the head of the first disk 201 substantially positions at the $A_{n+k+2}$ block. Thus, storing the $(n+2)^{th}$ parity data $P_{n+2}$ into the $A_{n+k+2}$ block can reduce the time and distance of shifting the head of the first disk 201.

According to the method for storing parity of the RAID 5, n is increased by 3 and the step S310 is repeated to obtain the first parity data $P_1$~the $m^{th}$ parity data $P_m$.

Moreover, k preferably equals to x*y, wherein x is the number of disks, and y is a positive integer pre-determined according to the writing speed of the disks.

In the present embodiment of the invention, the rotating parity RAID has three disks. However, the number of the disks is not for limiting the scope of technology of the invention. For example, in practical application, the rotating parity RAID can have four or more than four disks. The rotating parity RAID, which is exemplified by a RAID 5 in the present embodiment of the invention, can also be a RAID 50.

Second Embodiment

Figure 4:
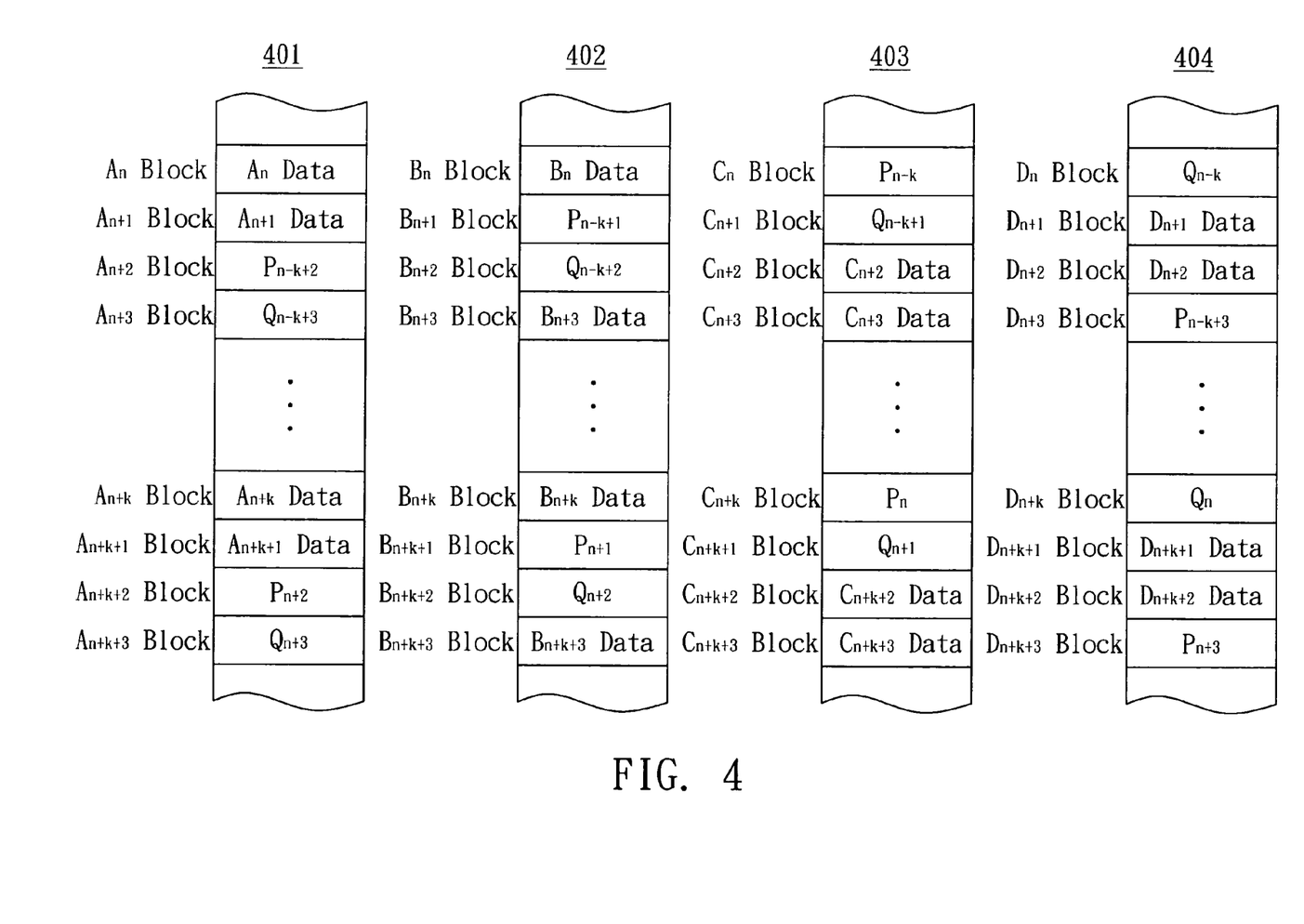
FIG. 4 is a perspective of a RAID 6 according to a second embodiment of the invention.

The present embodiment of the invention discloses the embodiment of a RAID 6. Referring to FIG. 4, a perspective of a RAID 6 according to a second embodiment of the invention is shown. As indicated in FIG. 4, the RAID 6 comprises at least a first disk 401, a second disk 402, a third disk 403 and a fourth disk 404. The first disk 401 has an $A_1$ block, an $A_2$ block, ..., and an $A_m$ block used for storing an $A_1$ data, an $A_2$ data, ..., and an $A_m$ data respectively. The second disk 402 has a $B_1$ block, a $B_2$ block, ..., and a $B_m$ block used for storing a $B_1$ data, a $B_2$ data, ..., and a $B_m$ data respectively. The third disk 403 has a $C_1$ block, a $C_2$ block, ..., and a $C_m$ block respectively used for storing a $C_1$ data, a $C_2$ data, ..., and a $C_m$ data. The fourth disk 404 has a $D_1$ block, a $D_2$ block, ..., and a $D_m$ block used for storing a $D_1$ data, a $D_2$ data, ..., and a $D_m$ data respectively. The $A_1$ block, the $B_1$ block, the $C_1$ block and the $D_1$ block are referred to as a first stripe. Similarly, the $A_2$ block ~the $A_m$ block, the $B_2$ block ~the $B_m$ block, the $C_2$ block ~the $C_m$ block, and the $D_2$ ~the $C_m$ block, and the $D_2$ block ~the $D_m$ block are referred to as a second stripe ~an $m^{th}$ stripe respectively. Despite the RAID 6 in the present embodiment of the invention has four disks, the invention is not limited thereto. That is, a person with ordinary skill in the art will understand that this invention is applicable to a RAID 6 which has five or more than five disks.

In the RAID 6, each stripe has two parity data obtained by operating a first polynomial and a second polynomial respectively so that data is stored with higher security. According to the RAID 6 of the second embodiment of the invention, the $n^{th}$ stripe has an $n^{th}$ parity data $P_n$ and another $n^{th}$ parity data $Q_n$. The $n^{th}$ parity data $P_n$ obtained from the $A_n$ data and the $B_n$ data is stored into the $C_{n+k}$ block; meanwhile, the $n^{th}$ parity data $Q_n$ obtained from the $A_n$ data and the $B_n$ data is stored into the $D_{n+k}$ block. The $(n+1)^{th}$ stripe has an $(n+1)^{th}$ parity data $P_{n+1}$ and another $(n+1)^{th}$ parity data $Q_{n+1}$. The $(n+1)^{th}$ parity data $P_{n+1}$ obtained from the $A_{n+1}$ data and the $D_{n+1}$ data is stored into the $B_{n+k+1}$ block, and the $(n+1)^{th}$ parity data $Q_{n+1}$ obtained from the $A_{n+1}$ data and the $D_{n+1}$ data is stored into the $C_{n+k+1}$ block. The $(n+2)^{th}$ stripe has an $(n+2)^{th}$ parity data $P_{n+2}$ and another $(n+2)^{th}$ parity data $Q_{n+2}$. The $(n+2)^{th}$ parity data $P_{n+2}$ obtained from the $C_{n+2}$ data and the $D_{n+2}$ data is stored into the $A_{n+k+2}$ block, and the $(n+2)^{th}$ parity data $Q_{n+2}$ obtained from the $C_{n+2}$ data and the $D_{n+2}$ data is stored into the $B_{n+k+2}$ block. The $(n+3)^{th}$ stripe has an $(n+3)^{th}$ parity data $P_{n+3}$ and another $(n+3)^{th}$ parity data $Q_{n+3}$. The $(n+3)^{th}$ parity data $P_{n+3}$ obtained from the $B_{n+3}$ data and the $C_{n+3}$ data is stored into the $D_{n+k+3}$ block, and the $(n+3)^{th}$ parity data $Q_{n+3}$ obtained from the $B_{n+3}$ data and the $C_{n+3}$ data is stored into the $A_{n+k+3}$ block, wherein $1 \leq (n+k+3) \leq m$; besides, m, n and k are positive integers. In terms of the fourth disk 404, the position of the head is substantially close to the $D_{n+k}$ block when it happens that the $n^{th}$ parity data $Q_n$ is obtained. Therefore, with the $n^{th}$ parity data $Q_n$ being stored into the $D_{n+k}$ block, the time and distance of shifting the head are reduced, hence the accessing efficiency of the RAID is improved.

According to the RAID 6 of the second embodiment of the invention, n is an increasing sequence whose difference is 4, that is, n=1, 5, 9, ..., for obtaining the first parity data $P_1$~the $m^{th}$ parity data $P_m$ and the first parity data $Q_1$~the $m^{th}$ parity data $Q_m$. Accordingly, the $C_n$ data stored in the $C_n$ block is the $(n-k)^{th}$ parity data $P_{n-k}$; the $D_n$ data stored in the $D_n$ block is the $(n-k)^{th}$ parity data $Q_{n-k}$. The $B_{n+1}$ data stored in the $B_{n+1}$ block is the $(n-k+1)^{th}$ parity data $P_{n-k+1}$; the $C_{n+1}$ data stored in the $C_{n+1}$ block is the $(n-k+1)^{th}$ parity data $Q_{n-k+1}$. The $A_{n+2}$ data stored in the $A_{n+2}$ block is the $(n-k+2)^{th}$ parity data $P_{n-k+2}$; the $B_{n+2}$ data stored in the $B_{n+2}$ block is the $(n-k+2)^{th}$ parity data $Q_{n-k+2}$. The $D_{n+3}$ data stored in the $D_{n+3}$ block is the $(n-k+3)^{th}$ parity data $P_{n-k+3}$; the $A_{n+3}$ data stored in the $A_{n+3}$ block is the $(n-k+3)^{th}$ parity data $Q_{n-k+3}$.

Furthermore, k is preferably equal to x*y, wherein x is the number of the disks. In the present embodiment of the invention, the RAID has four disks, so x=4. The value of y is a positive integer pre-determined according to the writing speed of the disks. As the faster the writing speed is, the smaller the value of y will be.

Figure 5:
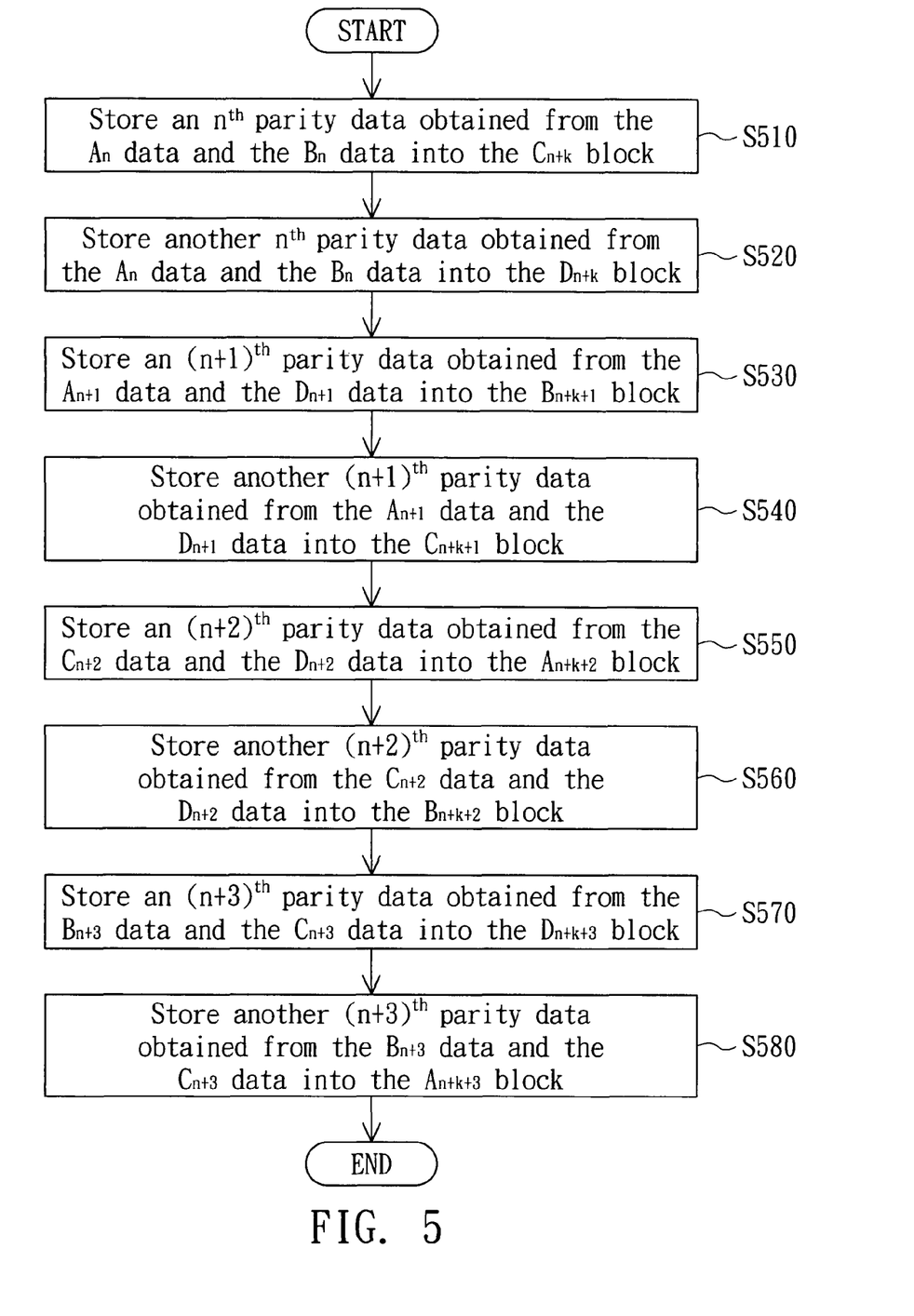
FIG. 5 s a flowchart of a method for storing parity of the RAID 6 according to a second embodiment of the invention.

The method for storing parity of the RAID 6 of the present embodiment of the invention is elaborated below with an accompanied flowchart. Referring to both FIG. 4 and FIG. 5, FIG. 5 is a flowchart of a method for storing parity of the RAID 6 according to a second embodiment of the invention. Firstly, the method begins at step S510, an $n^{th}$ parity data $P_n$ obtained from the $A_n$ data and the $B_n$ data by operating a first polynomial is stored into the $C_{n+k}$ block. Next, the method proceeds to step S520, the $n^{th}$ parity data $Q_n$ obtained from the $A_n$ data and the $B_n$ data by operating a second polynomial is stored into the $D_{n+k}$ block. When obtaining the $n^{th}$ parity data $P_n$ and $Q_n$, it happens that the head of the third disk 403 substantially positions at the $C_{n+k}$ block and the head of the fourth disk 404 substantially positions at the $D_{n+k}$ block. Thus, the distances of shifting the heads of the third disk 403 and the fourth disk 404 are reduced.

Then, the method proceeds to step S530, the $(n+1)^{th}$ parity data $P_{n+1}$ obtained from the $A_{n+1}$ data and the $D_{n+1}$ data is stored into the $B_{n+k+1}$ block. After that, the method proceeds to step S540, the $(n+1)^{th}$ parity data $Q_{n+1}$ obtained from the $A_{n+1}$ data and the $D_{n+1}$ data is stored into the $C_{n+k+1}$ block. When obtaining the $(n+1)^{th}$ parity data $P_{n+1}$ and $Q_{n+1}$, it happens that the head of the second disk 402 substantially positions at the $B_{n+k+1}$ block and the head of the third disk 403 substantially positions at the $C_{n+k+1}$ block. Thus, the distances of shifting the heads of the second disk 402 and the third disk 403 are reduced.

Afterwards, the method proceeds to step S550, the $(n+2)^{th}$ parity data $P_{n+2}$ obtained from the $C_{n+2}$ data and the $D_{n+2}$ data is stored into the $A_{n+k+2}$ block. Then, the method proceeds to step S560, the $(n+2)^{th}$ parity data $Q_{n+2}$ obtained from the $C_{n+2}$ data and the $D_{n+2}$ data is stored into the $B_{n+k+2}$ block. When obtaining the $(n+2)^{th}$ parity data $P_{n+2}$ and $Q_{n+2}$, it happens that the head of the first disk 401 substantially positions at the $A_{n+k+2}$ block and the head of the second disk 402 substantially positions at the $B_{n+k+2}$ block. Thus, the distances of shifting the heads of the first disk 401 and a second disk 402 are reduced.

After that, the method proceeds to step S570, the $(n+3)^{th}$ parity data $P_{n+3}$ obtained from the $B_{n+3}$ data and the $C_{n+3}$ data is stored into the $D_{n+k+3}$ block. Then, the method proceeds to step S580, the $(n+3)^{th}$ parity data $Q_{n+3}$ obtained from the $B_{n+3}$ data and the $C_{n+3}$ data is stored into the $A_{n+k+3}$ block. When obtaining the $(n+3)^{th}$ parity data $P_{n+3}$ and $Q_{n+3}$, it happens that the head of the fourth disk 404 substantially positions at the $D_{n+k+3}$ block and the head of the first disk 401 substantially positions at the $A_{n+k+3}$ block. Thus, the distances of shifting the heads of the fourth disk 404 and the first disk 401 are reduced, wherein $1 \leq (n+k+3) \leq m$; besides, m, n and k are positive integers.

According to method for storing parity of the RAID 6, n is increased by 4 and the step S510 is repeated to obtain the first parity data $P_1$~the $m^{th}$ parity data $P_m$ and the first parity data $Q_1$~the m parity data $Q_m$.

Moreover, k preferably equals to x*y, wherein x is the number of disks, and y is a positive integer pre-determined according to the writing speed of the disks.

In the present embodiment of the invention, the rotating parity RAID has four disks. However, the number of the disks is not for limiting the scope of technology of the invention. For example, in practical application, the rotating parity RAID can have five or more than five disks. The rotating parity RAID, which is exemplified by a RAID 6 in the present embodiment of the invention, can also be a RAID 60.

According to the rotating parity RAID and the method for storing parity of the same disclosed in the above embodiments of the invention, the $n^{th}$ parity data of the $n^{th}$ stripe is stored into the $(n+k)^{th}$ stripe. Thus, the time and distance of shifting the head of each disk of the RAID between different blocks are greatly reduced when reading, operating or writing data from or into each disk. Also, the efficiency of accessing disks is improved. Due to the head being a mechanical element, reducing the time and distance of shifting the head can extend the lifespan of the disk. Besides, the likelihood of disk run-down is reduced, and the stability of the redundant array of independent disks is increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotating parity redundant array of independent disk (RAID), comprising:
    a first disk having an $A_1$ block, an $A_2$ block, ..., and an $A_m$ block used for storing an $A_1$ data, an $A_2$ data, ..., and an $A_m$ data respectively;
    a second disk having a $B_1$ block, a $B_2$ block, ..., and a $B_m$ block used for storing a $B_1$ data, a $B_2$ data, ..., and a $B_m$ data respectively; and
    a third disk having a $C_1$ block, a $C_2$ block, ..., and a $C_m$ block used for storing a $C_1$ data, a $C_2$ data, ..., and a $C_m$ data respectively,
    wherein the $C_{n+k}$ data is an $n^{th}$ parity data obtained from the $A_n$ data and the $B_n$ data; the $B_{n+k+1}$ data is an $(n+1)^{th}$ parity data obtained from the $C_{n+1}$ data and the $A_{n+1}$ data; the $A_{n+k+2}$ data is an $(n+2)^{th}$ parity data obtained from the $B_{n+2}$ data and the $C_{n+2}$ data,
    wherein $1 \leq (n+k+2) \leq m$, besides, k=x*y, x is the number of the disks, the value of y is determined according to the writing speed of the disks, y, m, n and k are positive integers.

2. The rotating parity redundant array of independent disk according to claim 1, wherein n increases by 3 and is denoted as n=1, 4, 7. . . .

3. The rotating parity redundant array of independent disk according to claim 1, wherein the $n^{th}$ parity data is obtained from the $A_n$ data and the $B_n$ data by operating a polynomial.

4. The rotating parity redundant array of independent disk according to claim 1, the rotating parity redundant array of independent disk is a RAID 5 or a RAID 50.

5. A rotating parity redundant array of independent disk, comprising:
    a first disk having an $A_1$ block, an $A_2$ block, ..., and an $A_m$ block used for storing an $A_1$ data, an $A_2$ data, ..., and an $A_m$ data respectively;
    a second disk having a $B_1$ block, a $B_2$ block, ..., and a $B_m$ block used for storing a $B_1$ data, a $B_2$ data, ..., and a $B_m$ data respectively;
    a third disk having a $C_1$ block, a $C_2$ block, ..., and a $C_m$ block used for storing a $C_1$ data, a $C_2$ data, ..., and a $C_m$ data respectively; and
    a fourth disk having a $D_1$ block, a $D_2$ block, ..., and a $D_m$ block used for storing a $D_1$ data, a $D_2$ data, ..., and a $D_m$ data respectively,
    wherein the $C_{n+k}$ data is an $n^{th}$ parity data obtained from the $A_n$ data and the $B_n$ data, the $D_{n+k}$ data is another $n^{th}$ parity data obtained from the $A_n$ data and the $B_n$ data; the $B_{n+k+1}$ data is an $(n+1)^{th}$ parity data obtained from the $A_{n+1}$ data and the $D_{n+1}$ data, the $C_{n+k+1}$ data is another $(n+1)^{th}$ parity data obtained from the $A_{n+1}$ data and the $D_{n+1}$ data; the $A_{n+k+2}$ data is an $(n+2)^{th}$ parity data obtained from the $C_{n+2}$ data and the $D_{n+2}$ data, the $B_{n+k+2}$ data is another $(n+2)^{th}$ parity data obtained from the $C_{n+2}$ data and the $D_{n+2}$ data; the $D_{n+k+3}$ data is an $(n+3)^{th}$ parity data obtained from the $B_{n+3}$ data and the $C_{n+3}$ data, the $A_{n+k+3}$ data is another $(n+3)^{th}$ parity data obtained from the $B_{n+3}$ data and the $C_{n+3}$ data,
    wherein $1 \leq (n+k+3) \leq m$, besides, k=x*y, x is the number of the disks, the value of y is determined according to the writing speed of the disks, y, m, n and k are positive integers.

6. The rotating parity redundant array of independent disk according to claim 5, wherein n increases by 4 and is denoted as n=1, 5, 9. . . .

7. The rotating parity redundant array of independent disk according to claim 5, wherein the $n^{th}$ parity data is obtained from the $A_n$ data and the $B_n$ data by operating a first polynomial, and the another $n^{th}$ parity data is obtained from the $A_n$ data and the $B_n$ data by operating a second polynomial.

8. The rotating parity redundant array of independent disk according to claim 5, the rotating parity redundant array of independent disk is a RAID 6 or a RAID 60.

9. A method for storing parity of a rotating parity redundant array of independent disk, wherein the rotating parity RAID has a first disk, a second disk and a third disk, the first disk has an $A_1$ block, an $A_2$ block, ..., and an $A_m$ block used for storing an $A_1$ data, an $A_2$ data, ..., and an $A_m$ data respectively, the second disk has a $B_1$ block, a $B_2$ block, ..., and a $B_m$ block used for storing a $B_1$ data, a $B_2$ data, ..., and a $B_m$ data respectively, the third disk has a $C_1$ block, a $C_2$ block, ..., and a $C_m$ block used for storing a $C_1$ data, a $C_2$ data, ..., and a $C_m$ data respectively, the method for storing parity comprises:
(a) storing an $n^{th}$ parity data obtained from the $A_n$ data and the $B_n$ data into the $C_{n+k}$ block;
(b) storing an $(n+1)^{th}$ parity data obtained from the $C_{n+1}$ data and the $A_{n+1}$ data into the $B_{n+k+1}$ block; and
(c) storing an $(n+2)^{th}$ parity data obtained from the $B_{n+2}$ data and the $C_{n+2}$ data into the $A_{n+k+2}$ block,
wherein $1 \leq (n+k+2) \leq m$, besides, $k=x*y$, x is the number of the disks, the value of y is determined according to the writing speed of the disks, y, m, n and k are positive integers.

10. The method for storing parity according to claim 9, further comprises:
(d) increasing n by 3 and repeating the step (a).

11. The method for storing parity according to claim 9, wherein the step (a) further comprises:
(a-1) obtaining the $n^{th}$ parity data from the $A_n$ data and the $B_n$ data by operating a polynomial.

12. The method for storing parity according to claim 9, wherein the rotating parity redundant array of independent disk is a RAID 5 or a RAID 50.

13. A method for storing parity of a rotating parity redundant array of independent disk, wherein the rotating parity RAID comprises a first disk, a second disk, a third disk and a fourth disk, the first disk has an $A_1$ block, an $A_2$ block, ..., and a $A_m$ block used for storing an $A_1$ data, an $A_2$ data, ..., and an $A_m$ data respectively, the second disk has a $B_1$ block, a $B_2$ block, ..., and a $B_m$ block used for storing a $B_1$ data, a $B_2$ data, ..., and a $B_m$ data respectively, the third disk has a $C_1$ block, a $C_2$ block, ..., and a $C_m$ block used for storing a $C_1$ data, a $C_2$ data, ..., and a $C_m$ data respectively, the fourth disk has a $D_1$ block, a $D_2$ block, ..., and a $D_m$ block used for storing a $D_1$ data, a $D_2$ data, ..., and a $D_m$ data respectively, the method for storing parity comprises:
(a) storing an $n^{th}$ parity data obtained from the $A_n$ data and the $B_n$ data into the $C_{n+k}$ block;
(b) storing another $n^{th}$ parity data obtained from the $A_n$ data and the $B_n$ data into the $D_{n+k}$ block;
(c) storing an $(n+1)^{th}$ parity data obtained from the $A_{n+1}$ data and the $D_{n+1}$ data into the $B_{n+k+1}$ block;
(d) storing another $(n+1)^{th}$ parity data obtained from the $A_{n+1}$ data and the $D_{n+1}$ data into the $C_{n+k+1}$ block;
(e) storing an $(n+2)^{th}$ parity data obtained from the $C_{n+2}$ data and the $D_{n+2}$ data into the $A_{n+k+2}$ block;
(f) storing another $(n+2)^{th}$ parity data obtained from the $C_{n+2}$ data and the $D_{n+2}$ data into the $B_{n+k+2}$ block;
(g) storing an $(n+3)^{th}$ parity data obtained from the $B_{n+3}$ data and the $C_{n+3}$ data into the $D_{n+k+3}$ block; and
(h) storing another $(n+3)^{th}$ parity data obtained from the $B_{n+3}$ data and the $C_{n+3}$ data into the $A_{n+k+3}$ block,
wherein $1 \leq (n+k+3) \leq m$, besides, $k=x*y$, x is the number of the disks, the value of y is determined according to the writing speed of the disks, y, m, n and k are positive integers.

14. The method for storing parity according to claim 13, further comprises:
(i) increasing n by 4 and repeating the step (a).

15. The method for storing parity according to claim 13, wherein the step (a) further comprises (a-1) obtaining the $n^{th}$ parity data from the $A_n$ data and the $B_n$ data by operating a first polynomial, and the step (b) further comprises (b-1) obtaining the another $n^{th}$ parity data from the $A_n$ data and the $B_n$ data by operating a second polynomial.

16. The method for storing parity according to claim 13, wherein the rotating parity redundant array of independent disk is a RAID 6 or a RAID 60.

* * * * *